(12) United States Patent
Kerhuel et al.

(10) Patent No.: US 10,243,596 B1
(45) Date of Patent: Mar. 26, 2019

(54) RADIO FREQUENCY TRANSCEIVER HAVING DIGITAL PRE-DISTORTION FEEDBACK

(71) Applicant: NXP USA, INC., Austin, TX (US)

(72) Inventors: Samuel Kerhuel, Villeneuve Tolosane (FR); Wim Joseph Rouwet, Austin, TX (US); Vincent Pierre Martinez, Roques (FR)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/868,384

(22) Filed: Jan. 11, 2018

(30) Foreign Application Priority Data

Dec. 15, 2017 (EP) ..................... 17306787

(51) Int. Cl.
*H04B 1/04* (2006.01)
*H04L 27/26* (2006.01)
*H04B 1/44* (2006.01)

(52) U.S. Cl.
CPC ............. *H04B 1/0475* (2013.01); *H04B 1/44* (2013.01); *H04L 27/2646* (2013.01); *H04B 2001/0425* (2013.01)

(58) Field of Classification Search
CPC .................... H04B 1/0475; H04B 1/44; H04B 2001/0425; H04L 27/2646
See application file for complete search history.

(56) References Cited

U.S. PATENT DOCUMENTS

| | | | |
|---|---|---|---|
| 7,529,524 B1* | 5/2009 | Giallorenzi | H03F 1/3247 375/295 |
| 9,337,886 B1 | 5/2016 | Dick | |
| 2008/0144539 A1* | 6/2008 | Sperlich | H04L 5/1469 370/278 |
| 2012/0155572 A1* | 6/2012 | Kim | H03F 1/3247 375/297 |
| 2014/0348263 A1* | 11/2014 | Rollins | H04L 27/368 375/297 |
| 2015/0247920 A1* | 9/2015 | Asada | G01S 7/4008 342/189 |
| 2016/0329631 A1* | 11/2016 | Rheinfelder | H01Q 1/246 |
| 2017/0006561 A1 | 1/2017 | Su et al. | |
| 2017/0163295 A1* | 6/2017 | Talty | H04B 1/1036 |
| 2017/0170888 A1* | 6/2017 | Yrjola | H04B 7/0617 |
| 2017/0214553 A1* | 7/2017 | Ciacci | H04L 27/368 |
| 2017/0244445 A1* | 8/2017 | Jin | H04B 3/23 |
| 2017/0324161 A1* | 11/2017 | Kareisto | H01Q 3/267 |
| 2018/0191314 A1* | 7/2018 | Pratt | H03F 1/0233 |
| 2018/0270006 A1* | 9/2018 | Gao | H04B 1/48 |

* cited by examiner

*Primary Examiner* — Jaison Joseph

(57) ABSTRACT

A radio frequency (RF) transceiver includes a transmitter portion configured to transmit RF signals at an output of a power amplifier (PA). A receiver portion has an input coupled to the output of the PA. The receiver portion includes a switch coupled to feedback first baseband signals to the transmitter portion during a feedback mode. The first baseband signals are based on the first RF signals received at the input of the receiver portion. A pre-distortion processing unit is coupled to receive the first baseband signals. In turn, the distortion processing unit provides pre-distortion feedback signals to the transmitter portion.

18 Claims, 5 Drawing Sheets

RADIO FREQUENCY TRANSCEIVER HAVING DIGITAL PRE-DISTORTION FEEDBACK

BACKGROUND

Field

This disclosure relates generally to transceivers, and more specifically, to radio frequency transceivers having digital pre-distortion feedback.

Related Art

Today, radio frequency (RF) transceivers are integrated into a variety of semiconductor devices such as a system-on-a-chip (SoC) with an embedded controller. Many of these SoCs can be found in broad range of applications (e.g., wireless communications, networking, and the like) and products (e.g., automobiles, cellular telephones, and the like). As technology progresses, these SoCs are expected to reduce in size and power while increasing in performance. However, challenges exist in balancing size, power, and performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In digital pre-distortion (DPD) systems, a portion of the hardware resources are dedicated to capturing feedback samples from the transmit power amplifier (PA) to the on-chip DPD control loop. The portion of hardware resources may include circuitry such as data converters, I/O (serdes, JESD), processing hardware (e.g., accelerators, DSP cores). These hardware resources are costly in terms of SoC size and power consumption, for example, while being sparsely used (capturing samples in bursts, and remaining idle the rest of the time) to provide feedback samples. By leveraging hardware resources of the receiver circuitry, much of the traditional feedback circuitry can be eliminated.

Generally, there is provided, a radio frequency (RF) transceiver circuit including digital pre-distortion feedback path. A switch is used to capture receive samples from the receive signal processing chain during a feedback mode. The captured samples are routed to a DPD feedback processing unit which is coupled to the transmit signal processing chain to compensate for non-linearity of the PA. When in a receive mode, the switch is configured to allow the receive signal processing chain to operate normally. In a time division duplexing (TDD) configuration, the feedback mode occurs during transmit time periods without impacting the receive signal stream. However, in a frequency division duplexing (FDD) configuration, the feedback mode may occur during active receive time periods, thus interrupting or puncturing the receive signal stream. The term puncturing as used herein, refers to an interruption of a receive signal stream whereby zero-valued samples are inserted in the signal stream during the feedback mode. Puncturing the receive signal stream at predetermined time periods minimizes impact to the receive signal stream.

Figure 1:
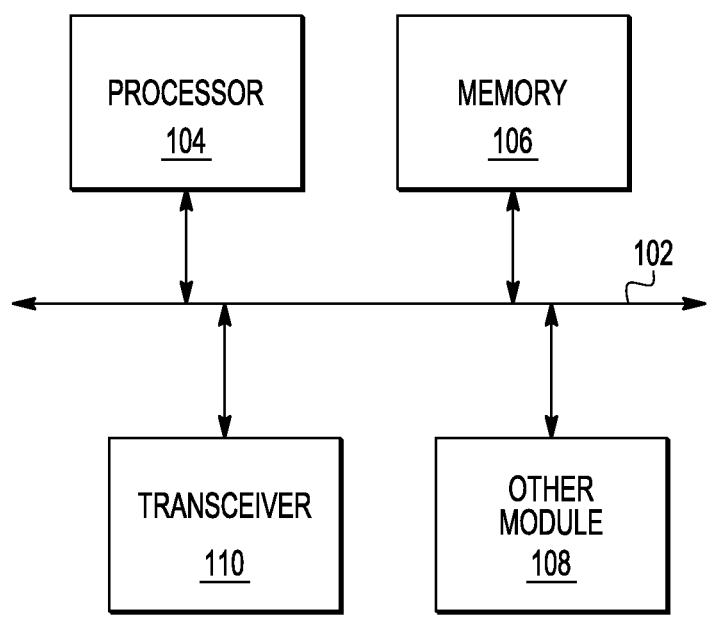
FIG. 1 illustrates, in simplified block diagram form, exemplary integrated circuit in accordance with an embodiment of the present invention.

FIG. 1 illustrates, in simplified block diagram form, an exemplary integrated circuit 100 in accordance with an embodiment. Integrated circuit 100 includes a system bus 102, processor 104, memory 106, other module 108, and a radio frequency (RF) transceiver 110. Processor 104, memory 106, other module 108, and transceiver 110 are each bi-directionally coupled to system bus 102 by way of respective communication buses. In some embodiments, integrated circuit 100 may be characterized as a system-on-a-chip (SoC).

System bus 102 can be any type of bus for communicating any type of information such as address, data, instructions, clocks, and control. System bus 102 provides a communication backbone for communications among the processor 104, memory 106, other module 108, and transceiver 110.

Processor 104 may be any type of processor, including circuits for processing, computing, etc., such as microprocessor (MPU), microcontroller (MCU), or digital signal processor (DSP). Integrated circuit 100 may include multiple processors like processor 104. Processor 104 is configured to execute instructions in order to carry out designated tasks.

Memory 106 may include any suitable type of memory array, such as static random-access memory (SRAM), for example. Memory 106 may also be coupled directly or tightly coupled to processor 104. Integrated circuit 100 may include multiple memories like memory 106 or a combination of different memories. For example, integrated circuit 100 may include a flash memory in addition to memory 106.

Other module 108 of processing system 100 may include any number of other circuits and functional hardware modules such as accelerators, timers, counters, communications, interfaces, analog-to-digital converters, digital-to-analog converters, PLLs, and the like for example.

Transceiver 110 may be used for communicating any one or more communication protocols. For example, in one embodiment, transceiver 110 may be an RF transceiver for wireless communication using LTE/4G, 5G, and the like communication protocols. In another embodiment, transceiver 110 may be used for a different protocol, such as wireline communication using DOCSYS, DSL, and the like communication protocols. An exemplary embodiment of transceiver 110 is illustrated in more detail in FIG. 2 and discussed below.

Figure 2:
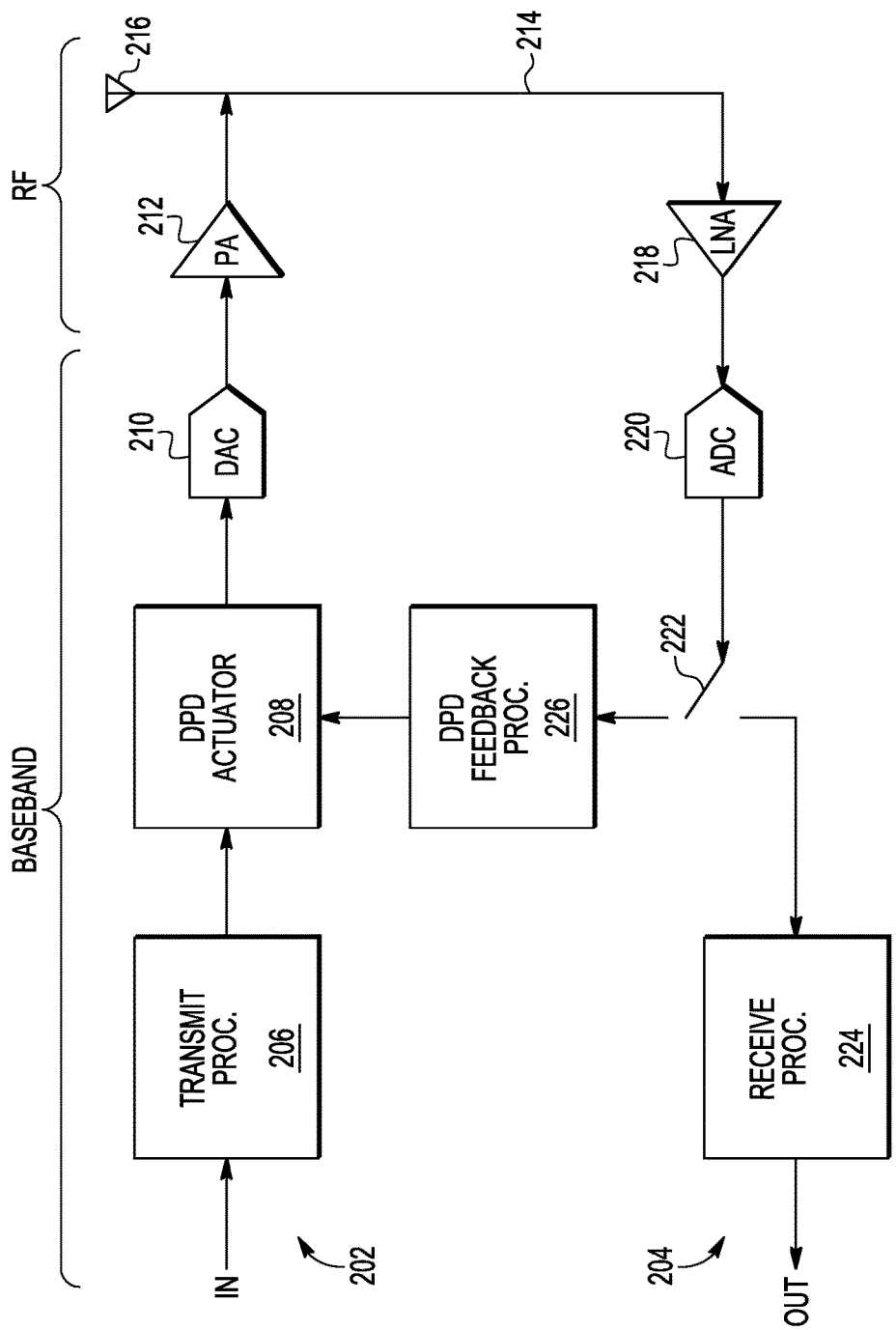
FIG. 2 illustrates, in simplified block diagram form, exemplary transceiver in accordance with an embodiment of the present invention.

FIG. 2 illustrates, in simplified block diagram form, exemplary radio frequency (RF) transceiver 110 having digital pre-distortion system in accordance with an embodiment of the present invention. Transceiver 110 includes a transmitter portion 202 and a receiver portion 204. Transmitter portion 202 forms a transmit signal processing chain including transmit processing unit 206, digital pre-distortion (DPD) actuator unit 208, digital-to-analog converter (DAC)

210, and power amplifier (PA) 212. Receiver portion 204 forms a receive signal processing chain including low noise amplifier (LNA) 218, analog-to-digital converter (ADC) 220, DPD receive switch 222, and receive processing unit 224. DPD feedback processing unit 226 is coupled between switch 222 and DPD actuator unit 208 for providing observation of a received signal. An output of transmitter 202 is coupled to an input of receiver 204 and antenna 216 at node 214. In some embodiments, node 214 may be characterized as a common RF port where both transmitter portion 202 and receiver portion 204 are both coupled to antenna 216.

Transceiver 110 may be formed as integrated circuit (IC) 100 having a baseband portion and an RF portion. The baseband portion may generally include digital circuitry of transmitter 202 and receiver 204, and the RF portion may generally include analog circuitry of transmitter 202 and receiver 204. Alternatively, transceiver 110 may include circuitry formed on multiple ICs. For example, in some embodiments, transceiver 110 may include the baseband portion formed on one IC and the RF portion formed on another IC.

In transmitter portion 202, transmit processing unit 206 is coupled to the system bus 102 to receive input signals labeled IN, and has an output coupled to a first input of DPD actuator unit 208. An output of DPD actuator unit 208 is coupled to an input of DAC 210. An output of DAC 210 is coupled to an input of power amplifier 212. An output of PA 212 is coupled to antenna 216 at node 214. The antenna 216 may be implemented as part of IC 100 including transmitter 202 and receiver 204, or may be implemented as a separate element coupled to the IC.

In receiver portion 204, LNA 218 has an input coupled to antenna 216 to receive RF signals, and an output coupled to an input of ADC 220. An output of ADC 220 is coupled to an input of switch 222. Output signals of switch 222 is shared between receiving processing unit 124 and DPD feedback processing unit 126. A first output of switch 222 is coupled to an input of receive processing unit 224, and a second output of switch 222 is coupled to an input of DPD feedback processing unit 226. An output of DPD feedback processing unit 226 is coupled to a second input of DPD actuator unit 208. An output of receive processing unit 224 is coupled to the system bus 102 to provide receiver output signals labeled OUT.

The transmit processing unit 206 includes circuitry such as filters, digital signal processors (DSP), accelerators, and the like configured to process signals IN and generates baseband signals (e.g., transmit JESD lanes) which are used by the DPD actuator unit 208. The DPD feedback processing unit 226 includes circuitry configured to sample ADC 220 output baseband signals by way of switch 222 and in turn, measures output of the PA 212 and compares the measured output to the intended transmitted signal. The DPD actuator unit 208 includes circuitry configured to receive computed information from the DPD feedback processing unit 226 and uses signal processing (e.g., DSP) to generate an approximation of the inverse transfer function of the PA 212 to compensate for non-linearity introduced by the PA 212. The DPD actuator unit 208 provides updates to the approximation based on the sampled baseband signals. The DPD actuator unit 208 may be implemented in forms of polynomial development (e.g., memory polynomial or Volterra series), forms of lookup tables, and the like. Receive processing unit includes circuitry such as filters, DSP, accelerators, and the like configured to process baseband signals received from ADC 220 when in the receive mode and generates bus signals OUT which are provided to system bus 102.

Transceiver 110 can operate in multiple configurations including time division duplex (TDD) and frequency division duplex (FDD), for example. In a receive mode, switch 222 is configured to transfer ADC output baseband signals to receive processing unit 224, and in a feedback mode, switch 222 is configured to transfer ADC output baseband signals to DPD feedback processing unit 226. Switch 222 will systematically transfer ADC output baseband signals to the DPD feedback processing unit 226 in the feedback mode such samples are fed back to the transmitter portion 202 to compensate for PA 212 non-linearity. Because transmit and receive functions are allocated different time periods in the TDD configuration, switch 222 can be configured to sample during transmit time periods without impacting receive time periods. When transceiver 110 is in an FDD configuration, switch 222 must sample during active receive time periods, thus puncturing the received signal stream. Accordingly, it is desirable to puncture the received signal stream at predetermined locations (e.g., sub-frame, symbols, cycle prefix (CP) times) to minimize any impact to the received signal stream.

Figure 3:
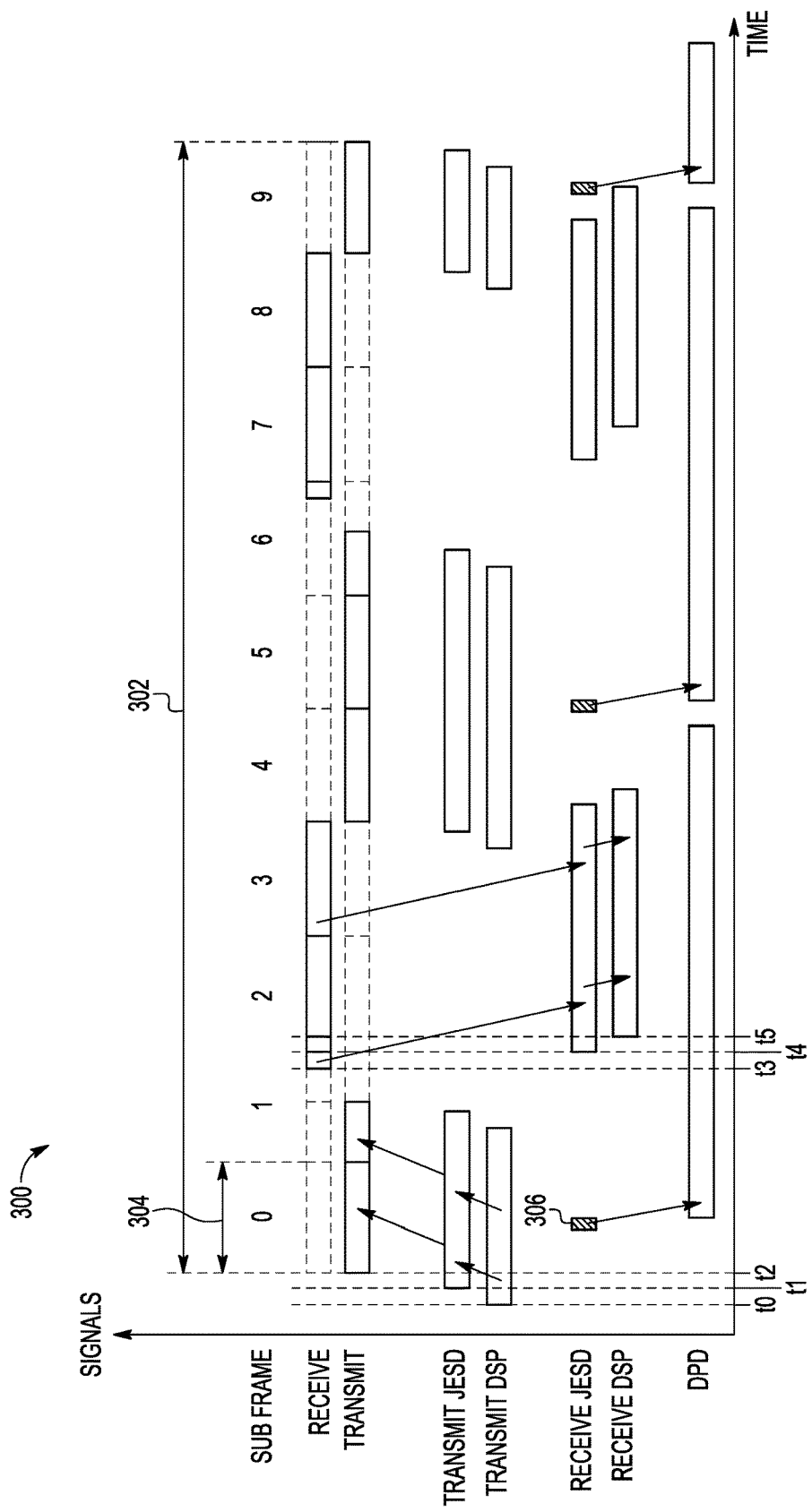
FIG. 3 illustrates, in simplified timing diagram form, one radio frame of a time division duplexing configuration in accordance with an embodiment of the present invention.

FIG. 3 illustrates, in simplified timing diagram form, an exemplary TDD operation 300 in accordance with an embodiment of the present invention. TDD operation 300 includes various transmit and receive signals shown on the Y-axis as a function of time shown on the X-axis. TDD operation 300 depicts functional signaling of transceiver 110 having transmit signals systematically sampled by way of switch 222 providing DPD feedback. TDD operation 300 includes a radio frame 302, sub-frames (0 through 9) 304, and DPD feedback samples 306. In this embodiment, radio frame has a duration of 10 ms with each sub-frame (0 through 9) having a duration of 1 ms. In this embodiment, the transmitter portion 202 is configured to transmit RF signals (TRANSMIT) at an output of a PA 212, and the receiver portion 204 is configured to receive RF signals (RECEIVE) at an input of LNA 218. The RF signals are transmitted and received on a same frequency band in the TDD operation 300.

At time t0 transmit data labeled TRANSMIT DSP is prepared (e.g., by DSP) and used to generate transmit JESD lanes labeled TRANSMIT JESD at time t1. This signal preparation occurs slightly ahead of actual transmission. At time t2, transmission operation progresses at sub-frame 0 as shown on signal labeled TRANSMIT. During sub-frame 0, DPD feedback samples 306 are captured during the feedback mode. Subsequent DPD signal processing of DPD feedback samples 306 are shown on signal labeled DPD. After transmit sub-frames, receive operation progresses at time t3 as shown on signal labeled RECEIVE. At time t4, RECEIVE JESD signals are generated based on the received signals output from ADC 220. At time t5, RECEIVE DSP signals are generated by processing (e.g., DSP) the RECEIVE JESD signals and are provided to system bus 102.

Figure 4:
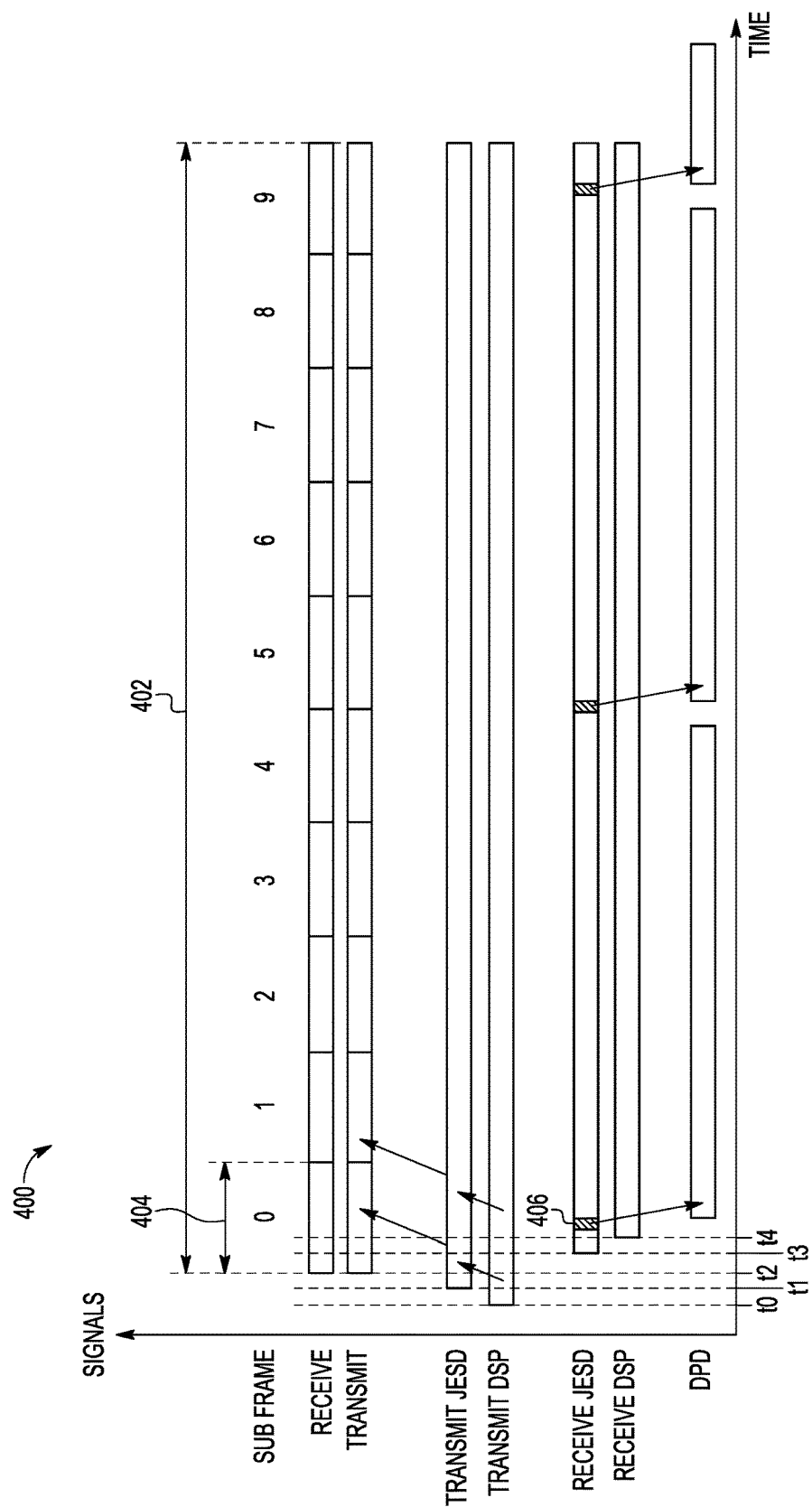
FIG. 4 illustrates, in simplified timing diagram form, one radio frame of a frequency division duplexing configuration in accordance with an embodiment of the present invention.

FIG. 4 illustrates, in simplified timing diagram form, an exemplary FDD operation 400 in accordance with an embodiment of the present invention. FDD operation 400 includes various transmit and receive signals shown on the Y-axis as a function of time shown on the X-axis. FDD operation 400 depicts functional signaling of transceiver 110 having transmit signals periodically sampled by way of switch 222 providing DPD feedback and puncturing the receive signal stream. FDD operation 400 includes a radio frame 402, sub-frames (0 through 9) 404, and DPD feedback samples 406. In this embodiment, radio frame has a duration of 10 ms with each sub-frame (0 through 9) having a duration of 1 ms. In this embodiment, the transmitter portion 202 is configured to transmit RF signals (TRANSMIT) at an output of a PA 212, and the receiver portion 204 is configured to receive RF signals (RECEIVE) at an input of LNA 218. The RF signals are transmitted on one frequency band and received on a different frequency band in the FDD operation 400.

At time t0 transmit data labeled TRANSMIT DSP is prepared (e.g., by DSP) and used to generate transmit JESD lanes labeled TRANSMIT JESD at time t1. At time t2, receive and transmit operations progress at sub-frame 0 as shown by signals labeled RECEIVE and TRANSMIT respectively. At time t3, RECEIVE JESD signals are generated based on the RECEIVE signals. At time t4, RECEIVE DSP signals are generated by processing (e.g., DSP) the RECEIVE JESD signals and are provided to system bus 102. In this embodiment, during sub-frame 0, DPD feedback samples 406 are captured. Feedback samples are also captured during sub-frames 4/5 and 9. Subsequent DPD signal processing of DPD feedback samples are shown on signal labeled DPD. Because the receive signal processing chain is active during the time periods when the DPD feedback samples are captured, receive signal stream is punctured (e.g., zero-valued samples inserted) during the time that switch 222 is configured in the feedback mode. As such, it is desirable to puncture the receive signal stream at suitable times to minimize any impact to the receive signal stream.

Figure 5:
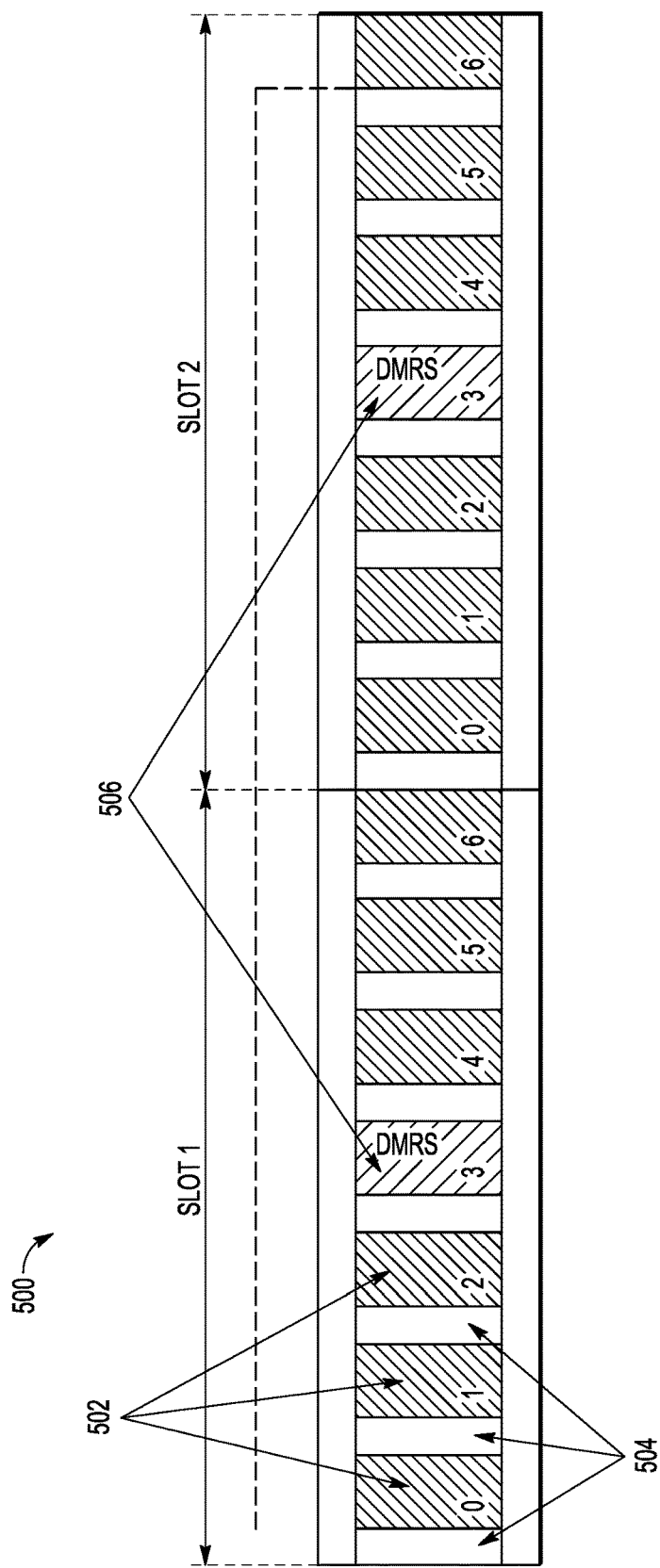
FIG. 5 illustrates, in simplified block diagram form, an exemplary sub-frame in accordance with an embodiment of the present invention.

FIG. 5 illustrates, in simplified block diagram form, an exemplary sub-frame 400 in accordance with an embodiment of the present invention. Sub-frame 400 is a more detailed view of sub-frames 0 through 9 depicted in FIG. 3 and FIG. 4. Sub-frame 400 includes two slots labeled SLOT1 and SLOT2. In this embodiment, each slot includes seven OFDM symbols 402 labeled 0 through 6 separated by normal cyclic prefix (CP) time periods 404. Symbol 3 (406) of SLOT1 and SLOT2 is characterized as demodulation reference signal labeled DMRS. In some embodiments, each slot may include six OFDM symbols when configured with extended CP time periods.

As provided above, because the receive signal processing chain is active during the time periods when the DPD feedback samples are captured, receive signal stream is interrupted during the feedback mode. Therefore, it is desirable to puncture the receive signal stream at suitable times to minimize any impact to the receive signal stream. For example, it may be desirable to puncture during the CP time periods in orthogonal frequency-division multiplexing (OFDM) systems because CP time periods are generally unused. It may also be desirable to puncture during OFDM data symbols rather than channel estimation OFDM symbols. In general, it may be desirable to puncture during time periods where the least number of users are expected. It may also be desirable to avoid round-robin schemes that would always puncture the same users or hybrid automatic repeat request (HARQ) process. It may be desirable to puncture during random-access channel (RACH) or broadcast channel time periods. Other suitable time periods may be used for puncturing which yield minimal impact on receive signal stream.

Generally, there is provided, a radio frequency (RF) transceiver circuit including a transmitter portion configured to transmit first RF signals at an output of a power amplifier (PA); and a receiver portion having an input coupled to the output of the PA, the receiver portion comprising a switch coupled to feedback first baseband signals to the transmitter portion during a feedback mode, the first baseband signals based on the first RF signals received at the input of the receiver portion, and a pre-distortion processing unit coupled to receive the first baseband signals and in turn, provide pre-distortion feedback signals to the transmitter portion. The transmitter portion may include a pre-distortion actuator unit coupled to the pre-distortion processing unit, the pre-distortion actuator unit configured to compensate for non-linearity of the PA based on the pre-distortion feedback signals. The receiver portion may further include a low noise amplifier (LNA) configured to receive the first RF signals and second RF signals; an analog-to-digital converter (ADC) coupled to an output of the LNA, the ADC coupled to the switch to provide the first baseband signals and second baseband signals, the second baseband signals based on the second RF signals. The receiver portion may further include a receive processing unit coupled to the switch, the switch configured to provide the second baseband signals to the receive processing unit during a receive mode. The receive processing unit may be coupled to a system bus, the receive processing unit configured to generate system bus signals based on the second baseband signals. The transmitter portion may be configured to transmit the first RF signals during a first period on a first frequency band, and the receiver portion is configured to receive the second RF signals during a second period on the first frequency band, and wherein the feedback mode occurs during the first period. The period may be characterized as a first sub-frame of a radio frame, and the second period may be characterized as a second sub-frame of the radio frame. The transmitter portion may be configured to transmit the first RF signals during a first period on a first frequency band, and the receiver portion may be configured to receive the second RF signals during the first period on a second frequency band, and wherein the feedback mode occurs during the first period. The first period may be characterized as a sub-frame of a radio frame, and the feedback mode may occur during a cycle prefix (CP) period of the sub-frame, the feedback mode causing the switch to interrupt providing the second baseband signals to the receive processing unit.

In another embodiment, there is provided, an integrated circuit including a transmitter portion configured to transmit first radio frequency (RF) signals at an output of a power amplifier (PA); and a receiver portion having an input coupled to the output of the PA, the receiver portion comprising a pre-distortion processing unit configured to receive a sample of first baseband signals and provide pre-distortion feedback signals to the transmitter portion, and a switch configured to provide the sample of the first baseband signals to the pre-distortion processing unit during a feedback mode, the first baseband signals based on the first RF signals received at the input of the receiver portion. The transmitter portion may include a pre-distortion actuator unit coupled to the pre-distortion processing unit, the pre-distortion actuator unit configured to compensate for non-linearity of the PA based on the pre-distortion feedback signals. The receiver portion may further include a low noise amplifier (LNA) configured to receive the first RF signals and second RF signals; an analog-to-digital converter (ADC) coupled to an output of the LNA, the ADC coupled to the switch to provide the first baseband signals and second baseband signals, the second baseband signals based on the second RF signals. The receiver portion may further include a receive processing unit coupled to the switch, the switch configured to provide the second baseband signals to the receive processing unit during a receive mode. The transmitter portion may be configured to transmit the first RF signals during a first period on a first frequency band, and the receiver portion may be configured to receive the second RF signals during a second period on the first frequency band, and wherein the feedback mode occurs during the first period. The transmitter portion may be configured to transmit the first RF signals during a first period on a first frequency band, and the receiver portion may be configured to receive the second RF signals during the first period on a second frequency band, and wherein the feedback mode occurs during the first period. The first period may be characterized as a sub-frame of a radio frame, and the feedback mode may occur during a cycle prefix (CP) period of the sub-frame, the feedback mode causing the switch to interrupt providing the second baseband signals to the receive processing unit. The first period may be characterized as orthogonal frequency-division multiplexing (OFDM) data symbol period, and the feedback mode may occur during the OFDM data symbol period, the switch configured to interrupt providing the second baseband signals to the receive processing unit during the feedback mode.

In yet another embodiment, there is provided, a method including transmitting first radio frequency (RF) signals at an output of a power amplifier (PA) of a transmitter portion of a transceiver; receiving the first RF signals at an input of a receiver portion of the transceiver; converting received first RF signals into first baseband signals; transferring samples of the first baseband signals to a pre-distortion processing unit by way of a switch during a feedback mode, the pre-distortion processing unit generating pre-distortion feedback signals based on the samples; and receiving pre-distortion feedback signals at an input of a pre-distortion actuator unit configured to compensate for non-linearity of the PA based on the pre-distortion feedback signals. The method may further include receiving second RF signals at the input of the receiver portion of the transceiver; converting received second RF signals into second baseband signals; transferring, by way of the switch during a receive mode, the second baseband signals to a receive processing unit coupled to a system bus. The transmitting first RF signals may include transmitting first RF signals during a first period on a first frequency band, receiving second RF signals comprises receiving second RF signals during the first period on a second frequency band different from the first frequency band, and transferring samples of the first baseband signals during the feedback mode interrupts transferring the second baseband signals during the receive mode.

By now it should be appreciated that there has been provided, a radio frequency (RF) transceiver circuit including digital pre-distortion feedback. A switch is used to capture receive samples from the receive signal processing chain during a feedback mode. The captured samples are routed to a DPD feedback processing unit which is coupled to the transmit signal processing chain to compensate for non-linearity of the PA. When in a receive mode, the switch is configured to allow the receive signal processing chain to operate normally. In a time division duplexing (TDD) configuration, the feedback mode occurs during transmit time periods without impacting the receive signal stream. However, in a frequency division duplexing (FDD) configuration, the feedback mode occurs during active receive time periods, thus interrupting or puncturing the receive signal stream. Puncturing the receive signal stream at predetermined time periods minimizes impact to the received signal stream.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio frequency (RF) transceiver circuit comprising:
a transmitter portion configured to transmit first RF signals at an output of a power amplifier (PA); and
a receiver portion having an input coupled to the output of the PA, the receiver portion comprising:
 a switch coupled to feedback first baseband signals to the transmitter portion during a feedback mode, the first baseband signals based on the first RF signals received at the input of the receiver portion,
 a pre-distortion processing unit coupled to receive the first baseband signals and in turn, provide pre-distortion feedback signals to the transmitter portion,
 a low noise amplifier (LNA) configured to receive the first RF signals and second RF signals,
 an analog-to-digital converter (ADC) coupled to an output of the LNA, the ADC coupled to the switch to provide the first baseband signals and second baseband signals, the second baseband signals based on the second RF signals, and
 a receive processing unit coupled to the switch, the switch configured to provide the second baseband signals to the receive processing unit during a receive mode;
wherein the transmitter portion is configured to transmit the first RF signals during a first period on a first frequency band, and the receiver portion is configured to receive the second RF signals during the first period on a second frequency band, and wherein the feedback mode occurs during the first period.

2. The circuit of claim 1, wherein the transmitter portion comprises a pre-distortion actuator unit coupled to the pre-distortion processing unit, the pre-distortion actuator unit configured to compensate for non-linearity of the PA based on the pre-distortion feedback signals.

3. The circuit of claim 1, wherein the receive processing unit is coupled to a system bus, the receive processing unit configured to generate system bus signals based on the second baseband signals.

4. The circuit of claim 1, wherein the transmitter portion is configured to transmit the first RF signals during a first period on a first frequency band, and the receiver portion is configured to receive the second RF signals during a second period on the first frequency band, and wherein the feedback mode occurs during the first period.

5. The circuit of claim 4, wherein the first period is characterized as a first sub-frame of a radio frame, and the second period is characterized as a second sub-frame of the radio frame.

6. The circuit of claim 1, wherein the first period is characterized as a sub-frame of a radio frame, and the feedback mode occurs during a cycle prefix (CP) period of the sub-frame, the feedback mode causing the switch to interrupt providing the second baseband signals to the receive processing unit.

7. An integrated circuit comprising:
a transmitter portion configured to transmit first radio frequency (RF) signals at an output of a power amplifier (PA); and
a receiver portion having an input coupled to the output of the PA, the receiver portion comprising:
 a pre-distortion processing unit configured to receive a sample of first baseband signals and provide pre-distortion feedback signals to the transmitter portion,
 a switch configured to provide the sample of the first baseband signals to the pre-distortion processing unit during a feedback mode, the first baseband signals based on the first RF signals received at the input of the receiver portion,
 a low noise amplifier (LNA) configured to receive the first RF signals and second RF signals,
 an analog-to-digital converter (ADC) coupled to an output of the LNA, the ADC coupled to the switch to provide the first baseband signals and second baseband signals, the second baseband signals based on the second RF signals, and
 a receive processing unit coupled to the switch, the switch configured to provide the second baseband signals to the receive processing unit during a receive mode;
wherein the transmitter portion is configured to transmit the first RF signals during a first period on a first frequency band, and the receiver portion is configured to receive the second RF signals during the first period on a second frequency band, and wherein the feedback mode occurs during the first period.

8. The circuit of claim 7, wherein the transmitter portion comprises a pre-distortion actuator unit coupled to the pre-distortion processing unit, the pre-distortion actuator unit configured to compensate for non-linearity of the PA based on the pre-distortion feedback signals.

9. The circuit of claim 7, wherein the transmitter portion is configured to transmit the first RF signals during a first period on a first frequency band, and the receiver portion is configured to receive the second RF signals during a second period on the first frequency band, and wherein the feedback mode occurs during the first period.

10. The circuit of claim 7, wherein the first period is characterized as a sub-frame of a radio frame, and the feedback mode occurs during a cycle prefix (CP) period of the sub-frame, the feedback mode causing the switch to interrupt providing the second baseband signals to the receive processing unit.

11. The circuit of claim 7, wherein the first period is characterized as orthogonal frequency-division multiplexing (OFDM) data symbol period, and the feedback mode occurs during the OFDM data symbol period, the switch configured to interrupt providing the second baseband signals to the receive processing unit during the feedback mode.

12. A method comprising:
transmitting first radio frequency (RF) signals at an output of a power amplifier (PA) of a transmitter portion of a transceiver during a first period on a first frequency band;
receiving the first RF signals at an input of a receiver portion of the transceiver;
converting received first RF signals into first baseband signals;
transferring samples of the first baseband signals to a pre-distortion processing unit by way of a switch during a feedback mode, the pre-distortion processing unit generating pre-distortion feedback signals based on the samples, wherein transferring samples of the first baseband signals during the feedback mode interrupts transferring the second baseband signals during the receive mode;

receiving pre-distortion feedback signals at an input of a pre-distortion actuator unit configured to compensate for non-linearity of the PA based on the pre-distortion feedback signals;

receiving second RF signals at the input of the receiver portion of the transceiver during the first period on a second frequency band different from the first frequency band;

converting received second RF signals into second baseband signals; and transferring, by way of the switch during a receive mode, the second baseband signals to a receive processing unit coupled to a system bus.

13. The method of claim 12, further comprising receiving the second RF signals during a second period on the first frequency band.

14. The method of claim 13, wherein the first period is characterized as a first sub-frame of a radio frame, and the second period is characterized as a second sub-frame of the radio frame.

15. The method of claim 14, the feedback mode occurs during a cycle prefix (CP) period of the first sub-frame.

16. The method of claim 12, wherein the feedback mode occurs during the first period.

17. The method of claim 12, wherein the first period is characterized as orthogonal frequency-division multiplexing (OFDM) data symbol period.

18. The method of claim 17, wherein the feedback mode occurs during the OFDM data symbol period.

* * * * *